UNITED STATES PATENT OFFICE.

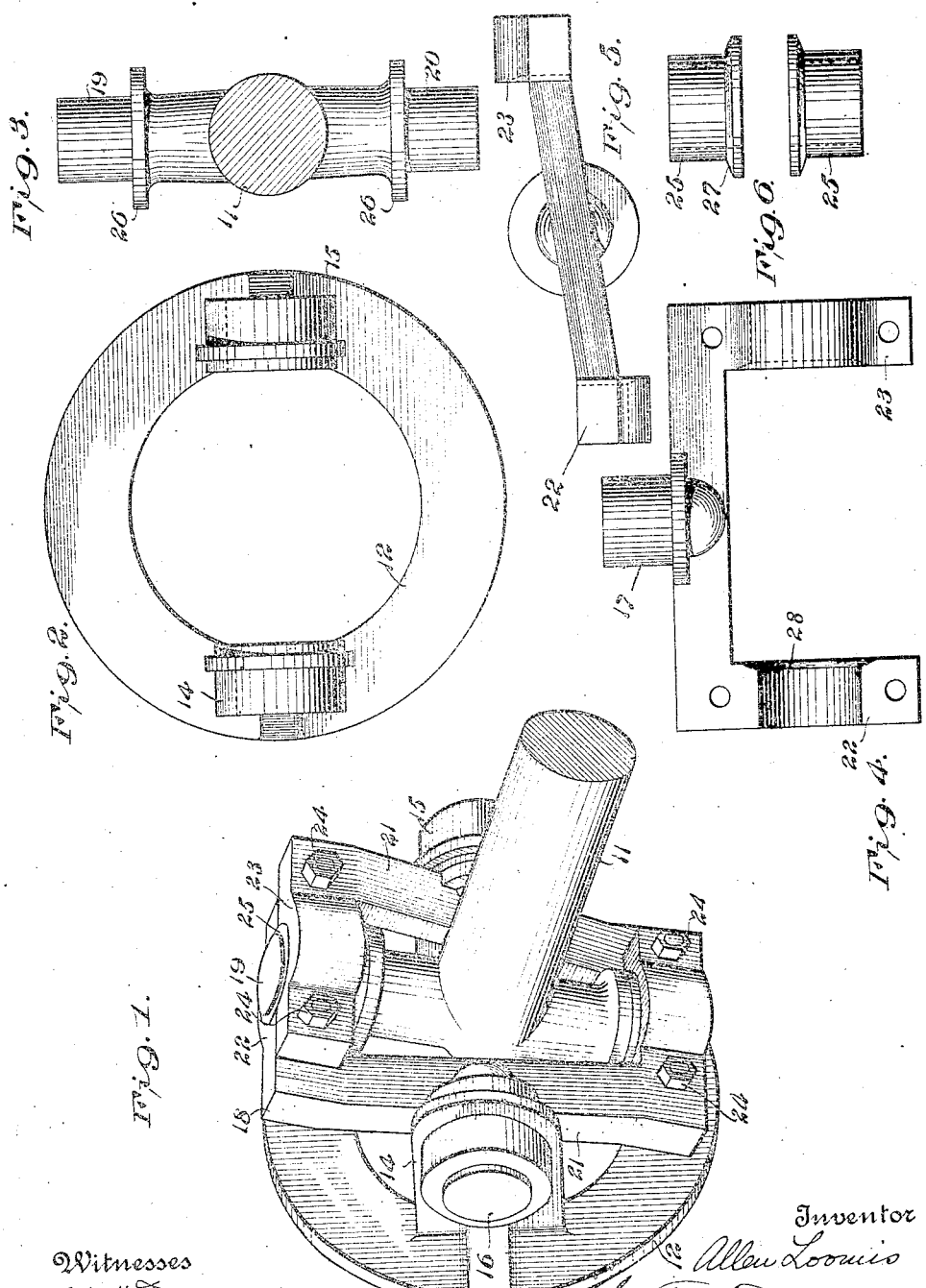

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

UNIVERSAL-JOINT COUPLING.

1,096,850.   Specification of Letters Patent.   Patented May 19, 1914.

Application filed June 29, 1911. Serial No. 636,081.

*To all whom it may concern:*

Be it known that I, ALLEN LOOMIS, a citizen of the United States, and residing at Detroit, in the county of Wayne and State of Michigan, have invented certain new and useful Improvements in Universal-Joint Couplings, of which the following is a specification.

This invention relates to universal joint couplings and more particularly to a coupling of this character adapted to connect the propeller shaft of a motor vehicle with the motor clutch shaft.

The objects of the invention are to provide a coupling which is simple and comparatively inexpensive, has few parts, and which may be readily disassembled and removed from the shafts so that none of the parts of the coupling will interfere with the removal of the clutch members from the clutch shaft.

The novel features of the invention will be more clearly understood from the following description taken in connection with the accompanying drawings, in which:

Figure 1 is a perspective view of a coupling embodying my invention; Fig. 2 is an end view of one of the shaft members; Fig. 3 is an end view of the other shaft member; Fig. 4 is a plan view of one of the halves of the intermediate connecting member; Fig. 5 is a side elevation of the same; and Fig. 6 is an elevation of the bushings for the pivotal connections of one of the shafts with the intermediate connecting member.

Referring to the drawings, the numeral 11 indicates one of the shafts and is here illustrated as the driven or propeller shaft of a motor vehicle. The numeral 12 indicates the other shaft and is here illustrated as a ring adapted to be attached to the motor clutch. The ring 12 has formed thereon projecting arms 14 and 15 in which bear the trunnions 16 and 17 of the intermediate connecting member indicated by the numeral 18. Instead of the ring 12 I may use a shaft similar to shaft 11 and having a yoke on its end carrying the arms 14 and 15. It will also be understood that either of the shafts may be used as the driving or the driven member.

The shaft 11 has formed at its end laterally projecting trunnions 19 and 20 which with the shaft have the general form of the letter T. The intermediate connecting member 18 is made up of two similar halves each consisting of a laterally extending portion 21, and at the ends of this laterally extending portion are arranged arms 22 and 23. The arms on the halves overlap and are secured together by suitable connecting means such as bolts 24. The portions 21 of the intermediate member carry trunnions 16 and 17, which engage the bearings on the arms 14 and 15, but it will be understood that the trunnions 16 and 17 may be carried by the shaft member 12 and the bearings for the same carried by the portions 21 of the intermediate member. Bearings for the trunnions 19 and 20 are formed between the connected arms of the intermediate member and, as shown, these bearings are provided with bushings 25. These bushings are provided with flanges 27 at one end which engage collars 26 on trunnions 19 and 20. The flanges 27 are spherically formed on the side adjoining the bearings and the inner faces of the bearings are also suitably formed at 28 to fit the spherical portions of the bushings. The trunnions 16, 17, 19 and 20 are shown as being in a common plane and the center about which the spherical portions of the bushings 25 is formed is located at the intersection of the axes of the trunnions. As thus constructed the shaft 11 may be withdrawn by removing the bolts 24 and then rotating the parts of the intermediate connecting member in opposite directions on the trunnions 16 and 17. Openings are thus provided between the arms 22 and 23 through which the trunnions on the shaft 11 may be withdrawn by partially rotating said shaft and then moving the same outwardly in the general direction of its axis. The parts of the intermediate connecting member may then be removed by withdrawing the trunnions 16 and 17 from their bearings.

It will be seen that this construction provides a simple coupling which requires but four bolts to secure the parts together. By the removal of these bolts the whole coupling may be readily disassembled.

It will be understood that the bushings 25 may be omitted and the bearings abut the flanges 26 which may be spherically formed on the abutting face in a manner similar to the flanges 27 of the bushings 25.

Having thus described my invention, what I claim is:

1. A universal joint coupling comprising driving and driven shaft members, and a separable connecting member having pivotal engagement with said shaft members, said member being adapted to be disengaged from one of said shaft members by rotation upon the pivotal connections with the other of said shaft members.

2. A universal joint coupling comprising driving and driven shaft members, and an open connecting member having pivotal engagement with said shaft members, said member being adapted to be disengaged from one of said shaft members by rotation upon the pivotal connections with the other of said shaft members.

3. A universal joint coupling comprising driving and driven shaft members, and a member having pivotal engagement with said shaft members, said member being separable at the pivotal connections with one of said shaft members and the parts of said member being independently rotatable to and from operative relation with said shaft member on the pivotal connections with the other of said shaft members.

4. A universal joint coupling comprising driving and driven shaft members, and a member having pivotal engagement with said shaft members and separable into two parts, said parts being adapted to be independently rotated to and from operative relation with one of said shaft members on the pivotal connections with the other of said shaft members.

5. A universal joint coupling comprising driving and driven shaft members, and a member connected with said shaft members by pivots, all of said pivots being in a common plane, and said member being separable into two parts each independently rotatable on a pivotal connection with one of said shaft members, when said shaft members are in operative position.

6. A universal joint coupling comprising driving and driven shaft members, an intermediate connecting member for said shaft members, trunnions on one of said shaft members, bearings on said intermediate member and engaging said trunnions, and trunnion connections between said member and the other of said shafts, said member comprising two parts separable at said bearings, and said parts being adapted to be independently rotated on said trunnion connections when said shaft members are in operative position.

7. A universal joint coupling comprising driving and driven shaft members, and an intermediate connecting member for said shaft members having longitudinally-arranged bearings engaging trunnions on one of said shaft members and laterally-arranged trunnion connections with the other of said shaft members, said connecting member being separable at said bearings into two parts each of which carries one-half of one of said bearings and the opposite half of the other of said bearings.

8. A universal joint coupling comprising driving and driven shaft members, and an intermediate member having pivotal connection with said shaft members, said intermediate member being separable into two parts each of which is adapted to be disengaged from one shaft member by rotation on its pivotal connection with the other shaft member and disengaged from said other shaft member by movement in the direction of the axis of the pivotal connection therewith.

9. A universal joint coupling comprising driving and driven shaft members, and an intermediate member having pivotal engagement with said shaft members, said member having bearings engaging pivots on one of said shaft members and being separable at said bearings into two parts each having a separate pivotal connection with the other of said shaft members and adapted for independent rotation thereon, and collars on said pivots engaging the inner face of said bearings and adapted to permit the parts of said member to be rotated out of engagement with said pivots.

10. A universal joint coupling comprising driving and driven shaft members, an intermediate member pivotally engaging said shaft members and separable at the pivotal connections with one shaft member into two parts which are adapted to be independently rotated on the pivotal connections with the other shaft member, and bushings arranged in the pivotal connections at which said intermediate member is separable, each bushing having a flange thereon conforming on one side to a zone of a sphere.

11. A universal joint coupling comprising driving and driven shaft members, and an intermediate member pivotally engaging said shaft members, the pivots being arranged in a common plane and said member being separable into two parts which are independently rotatable on the pivotal connections with one of said shaft members, and bushings arranged in the pivotal connections with the other of said shaft members, each bushing having a flange thereon conforming on one side to a zone of a sphere the center of which is at the intersection of the axes of the pivots.

12. A universal joint coupling comprising driving and driven shaft members, and an intermediate member having pivotal engagement with said shaft members, said member comprising two separable parts, and means for connecting said parts together, said parts when disconnected being adapted to be independently rotated in opposite directions on the pivotal connections with one of said shaft members, whereby the other of said shaft members is disengaged and may be withdrawn.

13. A universal joint coupling comprising driving and driven shaft members, and an intermediate connecting member for said shaft members, comprising two separable parts each of which has a laterally extending portion having a pivotal connection at an intermediate point with one of said shaft members and end portions offset in the same direction, said parts being oppositely arranged and having their offset portions overlapped and connected together and provided with bearings engaging trunnions on the other of said shaft members, the bearings of each of said parts being faced in opposite directions, whereby said parts may be oppositely rotated when disconnected.

14. A universal joint coupling comprising driving and driven shaft members, and an intermediate connecting members for said shaft members comprising two separate parts each of which has a laterally-extending portion having a pivotal connection at an intermediate point with one of said shaft members and end portions offset in the same direction and provided with bearings, said parts being oppositely arranged and having their bearings meeting and in engagement with pivots on the other of said shaft members and the bearings on each of said parts being oppositely faced.

15. A universal joint coupling comprising driving and driven shaft members, and an intermediate connecting member for said shaft members comprising two separable parts, each of which has alined, oppositely-faced bearings, and arms carrying said bearings and connected together by a laterally-extending member having a pivotal connection with one of said shaft members, and said parts being oppositely-arranged and having their bearings overlapped and together engaging pivots on the other of said shaft members, all of the pivotal connections being in a common plane and the pivotal connections with one shaft member being at right angles to the pivotal connection with the other shaft member.

In testimony whereof I affix my signature in presence of two witnesses.

ALLEN LOOMIS.

Witnesses:
W. H. FINCKEL, Jr.,
G. L. McCAIN.